June 24, 1947.  J. PRICHARD ET AL  2,422,747
CELLULOSE ETHER PLASTIC AND A CANTEEN MADE THEREOF
Filed April 15, 1944
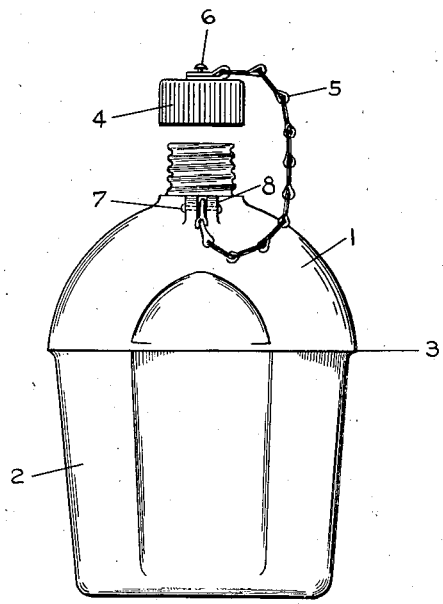
INVENTORS
JOHN PRICHARD.
DAVID FLITTER.
BY
ATTORNEYS.

Patented June 24, 1947

2,422,747

UNITED STATES PATENT OFFICE 2,422,747

CELLULOSE ETHER PLASTIC AND A CANTEEN MADE THEREOF

John Prichard, Bloomfield, and David Flitter, Newark, N. J., assignors to Celanese Corporation of America, a corporation of Delaware Application April 15, 1944, Serial No. 531,264

7 Claims. (Cl. 106—178)

This invention relates to vessels or containers suitable for storing liquids and relates more particularly to vessels, such as canteens, having a basis of an ethyl cellulose composition.

It is an important object of this invention to provide plastic compositions having a basis of an ethyl cellulose composition which will be strong, rugged and of high impact strength and which will not impart an unpleasant, disagreeable or foreign odor or taste to the liquids or other materials which come in contact with said plastic composition when formed into canteens or other vessels.

Other objects of this invention will appear from the following detailed description and the accompanying drawing.

In the drawing, the figure is a side elevational view of one form of canteen which may be formed from an ethyl cellulose composition of my invention by molding and cementing operations.

Ethyl cellulose when suitably compounded is an excellent material for the manufacture of plastic articles by molding operations. Some articles formed of ethyl cellulose compositions must stand extremely severe service conditions in order to be acceptable. One such application for ethyl cellulose wherein the article formed must be of high impact strength and resistant to wide extremes of heat and cold is in the manufacture of canteens for military service. In order to be entirely acceptable such ethyl cellulose canteens must undergo very severe tests without failure.

Thus, for example, one test for impact resistance requires that the canteen be filled with water at about 77° F. and dropped to a concrete surface from a height of 10 feet without fracturing. The canteen should not fracture even on repeating this test. Another important test comprises filling the canteen with water at 180° F. and maintaining it in water at 180° F. for one hour. To be satisfactory, the canteen must not show any warpage, distortion or softening as a result of this treatment. An even more severe and drastic test which satisfactory canteens must withstand is to maintain their structure without fracturing not only when subjected to a temperature of —10° F. for 24 hours while filled 90% with water but also when dropped immediately on removal from the low temperature from a height of six feet to a concrete or other hard surface. The ethyl cellulose composition must also be free of any tendency to impart foreign tastes or odors to liquid materials which come in contact with the ethyl cellulose composition. The successful formulation of such ethyl cellulose compositions has, prior to our invention, proven to be a problem of substantial practical difficulty.

We have now discovered that ethyl cellulose may be formulated into compositions adapted to yield molded articles, such as canteens and other vessels, capable of resisting fracture and deformation when subjected to the extremely severe freezing, impact and heat tests heretofore described. In accordance with our invention, compositions possessing these unusual characteristics may be obtained by formulating 100 parts by weight of ethyl cellulose of an ethoxyl value of preferably 45.5 to 46.8% wtih at most 20 parts by weight of plasticizer comprising 5 to 10 parts by weight of mineral oil and 10 to 15 parts by weight of a long chain fatty acid ester plasticizer such as, for example, butyl stearate, butyl palmitate, amyl stearate or dibutyl sebacate. Preferably, we employ butyl stearate. In some instances it is desirable that the ethyl cellulose composition should also contain about 0.5 part by weight of a stabilizer such as diphenyl amine. Ethyl cellulose compositions within these very specific ranges have proven to be particularly suited to the formation of low temperature, high impact, and heat-resistant compositions, and are most particularly suited for the manufacture of canteens and other vessels or containers such as ice-cube trays which are continuously subjected to the most severe conditions of service.

We have also discovered that the tendency of certain ethyl cellulose compositions to impart unpleasant foreign tastes or odors to liquid materials which come in contact with such compositions may be entirely overcome by a novel treatment of the plasticizers employed in forming said ethyl cellulose compositions. Heretofore, to eliminate the foreign tastes small amounts of flavoring materials, for example, vanillin, have been added to the ethyl cellulose compositions. While such a step is effective it is so only to a limited degree since it is merely a masking of the original undesirable taste- or odor-imparting property of the plastic composition with a different flavor. The latter, while it may not be disagreeable or markedly unpleasant may be distinctly objectionable when present in some beverages or foods.

The elimination of the taste- or odor-imparting characteristics may be effected by passing live steam through the plasticizer, while it is contained in a suitable vessel, or by boiling the plasticizer with water. Thus, for example, when treating the usual commercial grade of butyl stearate, passing live steam therethrough for about 30 minutes, is satisfactory. Following this treatment, the butyl stearate is washed once or twice with a 5 to 10% aqueous solution of sodium bicarbonate, or ammonia, at a temperature of from 20 to 90° C. This treatment serves to neutralize any traces of acid present. Preferably, washing is effected at from 50 to 60° C. Following the alkali wash, the butyl stearate is washed with water several times and dried. Equally satisfactory results may be obtained when boiling the plasticizer with water, by adding from 2.5 to 3 parts or more by weight of water to one part of the plasticizer and boiling the mixture for about 60 minutes. The plasticizer is then washed with dilute aqueous alkali and water, as previously described and is finally dried. The treated plasticizer may then be compounded with ethyl cellulose to yield the desired tasteless and odorless compositions. This treatment is especially advantageous in rendering butyl stearate entirely innocuous and unobjectionable.

In order further to illustrate our invention but without being limited thereto, the following example is given:

*Example*

To 20 parts by weight of commercial butyl stearate are added 60 parts by weight of water and the mixture is heated to boiling for 60 minutes. The water remaining is separated by decantation and the butyl stearate is washed with a 10% aqueous solution of sodium bicarbonate followed by two water washes at 60° C. The butyl stearate is then dried. 12 parts by weight of the butyl stearate treated as above are compounded with 100 parts by weight of ethyl cellulose (45.5 to 46.8% ethoxyl), 5 parts of refined mineral oil known in the trade as "Fractol A" and 0.5 part of diphenylamine. Suitable coloring matter is added to give, say, an olive drab translucent appearance. The mixture is reduced to a homogeneous mass on a suitable mill as is well known in the art and the homogeneous mass is then sheeted and broken up into pellets or to a fine particle size to form a molding powder.

A canteen is injection molded of the molding powder, prepared as above, in two sections and comprises, as shown in the drawing, an upper section 1 and a lower section 2. The separately molded sections are then cemented together after softening the portions of the surfaces to be joined. The softening may be effected by placing the ends in 95 to 100% ethyl alcohol, strengthened, if desired, with a small quantity of a more active solvent, to a depth of about $\frac{1}{16}$ of an inch for about 2 minutes. When soft, the upper section 1 is placed in register on the lower section 2 in a suitable jig and pressure is exerted so that a seal is formed along the line indicated by reference numeral 3 after the cemented joint dries. The canteen is then provided with an internally threaded cap 4 attached to a chain 5 swiveled on a pin 6, the other end of chain 5 being attached to a pin 7 set in a suitable shoulder 8 molded into the upper section 1 of the canteen. Cap 4 is usually formed of a fabric filled thermosetting plastic composition and is provided with a gasket (not shown) whereby a liquid-tight seal may be maintained when cap 4 is screwed on to the assembled canteen.

Canteens or other vessels formed of an ethyl cellulose composition formed in accordance with our invention are not only rugged and of high impact strength but, as pointed out, do not impart unpleasant or disagreeable foreign tastes or odors to beverages such as water, coffee or tea, or other liquids, regardless of how long they are stored therein.

It is to be understood that the foregoing detailed description is given merely by way of illustration and that many variations may be made therein without departing from the spirit of our invention.

Having described our invention, what we desire to secure by Letters Patent is:

1. A high impact strength plastic material, suitable for use as water containers, of improved resistance to shock and to heat and cold, consisting of 100 parts by weight of ethyl cellulose having an ethoxy value of 45.5 to 46.8%, 5 parts by weight of refined mineral oil, and 12 parts by weight of butyl stearate.

2. A canteen having a basis of a plastic material of improved resistance to shock and to heat and cold, consisting of 100 parts by weight of ethyl cellulose having an ethoxy value of 45.5 to 46.8%, 5 parts by weight of refined mineral oil and 12 parts by weight of butyl stearate.

3. A high impact strength plastic material, suitable for use as water containers, of improved resistance to shock and to heat and cold, consisting of 100 parts by weight of ethyl cellulose having an ethoxy value of 45.5 to 46.8%, 5 parts by weight of refined mineral oil, 12 parts by weight of butyl stearate and 0.5 part by weight of diphenylamine.

4. A canteen having a basis of a plastic material of improved resistance to shock and to heat and cold, consisting of 100 parts by weight of ethyl cellulose having an ethoxy value of 45.5 to 46.8%, 5 parts by weight of refined mineral oil, 12 parts by weight of butyl stearate and 0.5 part by weight of diphenylamine.

5. A canteen having a basis of a non-taste imparting plastic material of improved resistance to shock and to heat and cold, consisting of 100 parts by weight of ethyl cellulose having an ethoxy value of 45.5 to 46.8% and at most 20 parts by weight of plasticizer, comprising 5 to 10 parts by weight of refined mineral oil, 10 to 15 parts by weight of purified butyl stearate and 0.5 part by weight of diphenylamine, said butyl stearate being purified by being boiled with water, washed with aqueous alkali and then washed with water, whereby the taste- and odor-imparting materials are removed.

6. A canteen having a basis of a non-taste imparting plastic material, of improved resistance to shock and to heat and cold, consisting of 100 parts by weight of ethyl cellulose having an ethoxy value of 45.5 to 46.8% and at most 20 parts by weight of plasticizer, comprising 5 to 10 parts by weight of refined mineral oil, 10 to 15 parts by weight of purified butyl stearate and 0.5 part by weight of diphenylamine, said butyl stearate being purified by passing live steam therethrough, washed with aqueous alkali, and then washed with water, whereby the taste- and odor-imparting materials are removed.

7. A canteen having a basis of a non-taste imparting plastic material of improved resistance to shock and to heat and cold, consisting of 100 parts by weight of ethyl cellulose having an ethoxy value of 45.5 to 46.8%, 5 parts by weight of refined mineral oil, 12 parts by weight of butyl stearate and 0.5 part by weight of diphenylamine, said butyl stearate being purified by being boiled with water, washed with aqueous alkali, and then washed with water, whereby the taste- and odor-imparting materials are removed.

JOHN PRICHARD.
DAVID FLITTER.

REFERENCES CITED

The following references are of record in the file of this patent:

UNITED STATES PATENTS

| Number | Name | Date |
|---|---|---|
| 2,326,811 | Wiggam et al. | Aug. 17, 1943 |
| 2,300,458 | Mazzucchelli | Nov. 3, 1942 |
| 2,294,723 | Dreshfield | Sept. 1, 1942 |
| 1,460,097 | Donohue et al. | June 26, 1923 |
| 2,362,166 | Speicher | Nov. 7, 1944 |
| 2,326,810 | Wiggam | Aug. 17, 1943 |
| 2,383,548 | Hemming | Aug. 28, 1945 |

OTHER REFERENCES

"Ethocel Handbook," Dow Chemical Co., Midland, Mich., 1940 edition, pages 30-31. Copy in Div. 64.